Aug. 11, 1959     C. M. CHERRIER     2,899,275
MANUFACTURE OF HYDROCYANIC ACID
Filed July 9, 1957
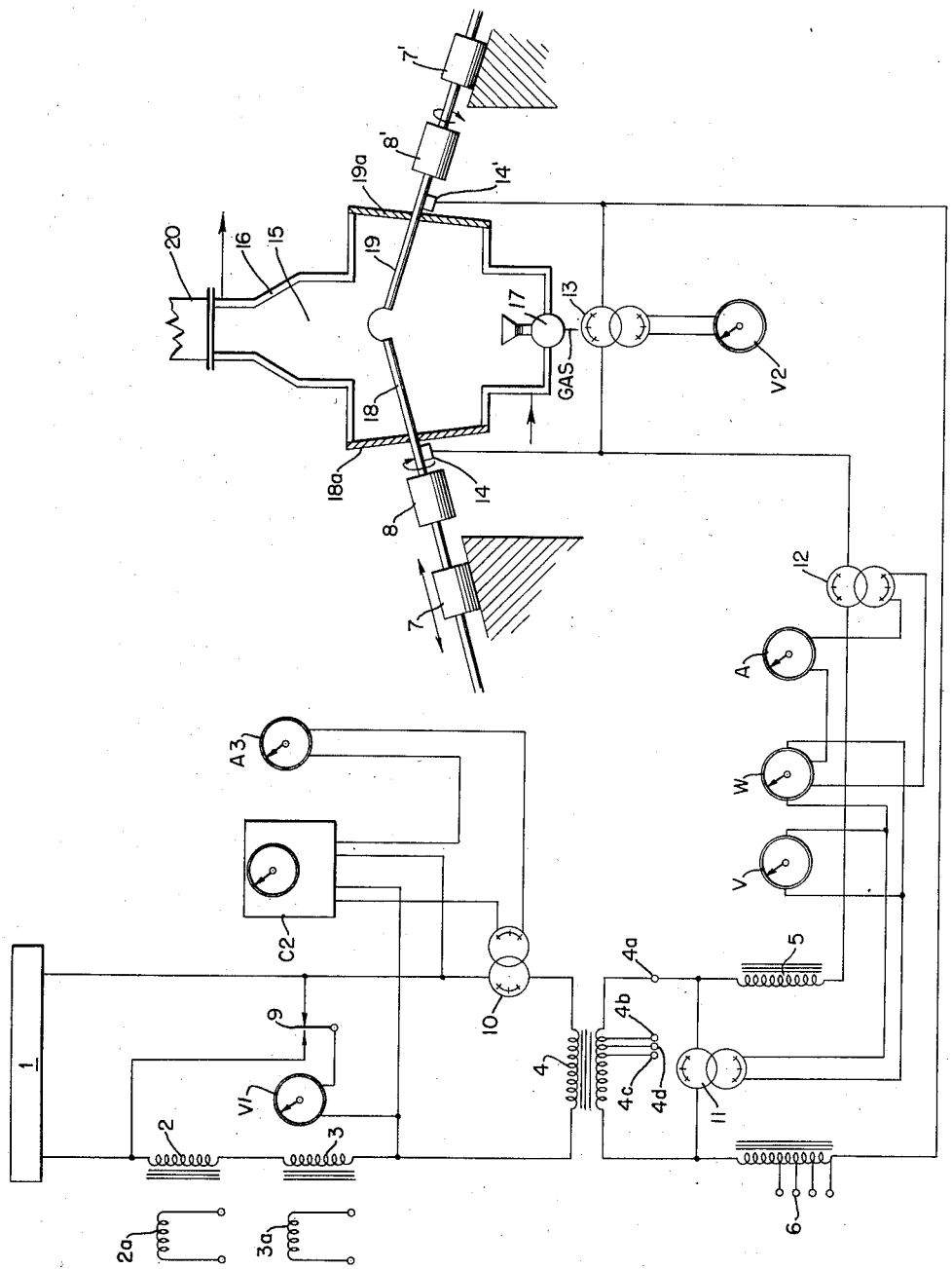
INVENTOR.
CLAUDE MICHEL CHERRIER
BY
*Bauer and Seymour*
ATTORNEYS 2,899,275
Patented Aug. 11, 1959

2,899,275

MANUFACTURE OF HYDROCYANIC ACID

Claude Michel Cherrier, St-Mande, France, assignor to Societe Anonyme des Manufactures des Glaces et Produits Chimiques de Saint-Gobain, Chauny & Cirey, Paris, France Application July 9, 1957, Serial No. 670,725

Claims priority, application France July 31, 1956

7 Claims. (Cl. 23—151)

This invention relates to the manufacture of hydrocyanic acid, and constitutes an improvement over a known process.

A known process of making HCN by direct synthesis is carried out in gas phase by passing a mixture of hydrocarbon, hydrogen and nitrogen, or a mixture of hydrocarbon and ammonia through an electric arc. A hydrocarbon of 1-4 carbon atoms is mixed with ammonia in a ratio of 1 atom gram of carbon to 0.5-1.2 mols of $NH_3$ at atmospheric pressure in the absence of oxygen and exposed to an arc for about 0.001 second using 32 v. 254 a. D.C. in the arc and a power ratio of 47-54 liters of gas/hr./kw. That process is distinguished, under the best conditions, whether using D.C. or A.C., by mediocre yields, the consumption of power being at least 30-40 kw. hr./kg. of HCN produced.

It is the object of this invention to improve the efficiency of that process by increasing the yield of HCN compared to the energy consumed, while maintaining a satisfactory yield with respect to the quantity of raw materials put into the arc. A material difficulty has heretofore prevented this improvement, because the arc tended to destroy the HCN produced if the gases were left in the arc for more than 0.001 second.

The object of the invention is accomplished by exposing the gaseous mixture, preferably ammonia and a hydrocarbon of the lower aliphatic series, either saturated or unsaturated, at sub-atmospheric pressure, generally between 50 or even 40 mm. and 120 mm. of Hg to an electric arc for durations which can be materially longer than before, and are conveniently between 0.01 or 0.04 sec. to 0.001 sec., using a power ratio of 120-350 liters per hour per kilowatt consumed in the arc. The voltage used in the arc is high and the amperage is low, the former being 2,000 volts or somewhat more, and the latter being several or a few amperes. The preferred pressure is between 40 and 75 mm. of Hg and the supply is proportioned to the power used in the arc so as to be of the order of 180-350 liters (calculated at 0° and 760 mm. Hg) per hour per kilowatt of power used in the arc. The ratio of volts to amperes in the new process is preferably in the range between 400/1 and 1500/1. The lower hydrocarbons of the aliphatic series, those having 1-12 carbon atoms, are useful, but those having 1-4 carbon atoms are satisfactory and are preferred. Thus, methane, ethane, propane, butane, ethylene, propylene, and butylene and their isomers are preferred hydrocarbons. In the case of propylene, the gas may be supplied at the relatively low rate of 120-240 liters/hr., as compared with the rate of 1465 liters/hr. specified in the prior art process for this gas. One cause of this advantage is that the temperature of the reaction is about 1100°-1300° C. in this invention, which is much cooler than that of the prior art process. These conditions lead to yet another advantage, that one may extend and draw out the arc through the gas, as indicated in the drawing.

The optimum value of the supply of gaseous mixture varies according to the nature of the hydrocarbon. One can use pure gases or mixtures, for instance the mixtures produced by industrial processes which are found in commerce. It is advisable to exclude oxygen from the process as its presence reduces the yield of HCN by producing CO, $CO_2$, $H_2O$ and nitrogen oxides as by-products.

To obtain best results one supplies the following quantities of the mixture, according to the type of hydrocarbon present in the ammonia mixture:

270-350 liters/hr./kw. of power consumed in the arc when methane is the hydrocarbon present;

240-260 liters/hr./kw. when $C_2$ hydrocarbons are used;

180-240 liters/hr./kw. when hydrocarbons of $C_3$ or more are used.

The figure of the drawing, which illustrates a preferred form of the invention, is a schematic representation of an apparatus capable of producing the conditions favorable to the process wherein the drawing represents a reactor in which the manufacture of hydrocyanic acid is carried out by an electric arc and the instruments used to supply the arc.

The impedance of the arc changes from the moment when the first flash is induced under a vacuum in the reactor, the electrodes being close together, and the moment when the reactor has attained normal operating conditions, the electrodes being well separated and the gas circulating within the reactor at the selected pressure. There is placed between the power mains and the electric arc an apparatus for matching the variable impedance of the discharge while the normal operating conditions are being attained. This matching of impedance is obtained by a collection of transducers or magnetic amplifiers, transformers, and of fixed inductances. At the moment when the discharge begins in the reactor, there is major need for voltage and very little for amperage in the induction coil of the arc, but as the gas is admitted to the reactor and the electrodes are separated, it is necessary to increase the amperage at the terminals of the arc, which is easily done by modifying the direct current in the auxiliary coils of the transducers. The apparatus is assembled so that when normal operation is attained, the transducers may be entirely cut off, only the fixed inductances connected to the secondary of the transformer matching the impedance of the arc to that of the transformer secondary.

On the drawings, a circuit breaker 1 is placed directly in the line to the mains and transducers 2 and 3, the characteristics of which may be modified by regulating the direct current sent to the auxiliary coils $2a$ and $3a$ connected thereto. The first transducer 2 is of medium power, and the second 3 is of great power. A high-tension transformer 4 furnishes to the secondary the high voltage necessary for the arc. The secondary includes several take-offs $4a$, $4b$, $4c$ and $4d$ which lend flexibility to the apparatus. Fixed inductances 5 and 6 are in the lines between the secondary and the electrodes.

Apparatus of control including elements 9 and $V_1$, is employed; employed $V_1$ is a two-directional voltmeter which permits one to measure the variations in voltage in the transducers as well as the differences in potential at the terminals of the transformer primary. An amperemeter, including elements 10 and $A_3$, measures the current absorbed by the installation. In computing the effectiveness of the process one distinguishes between that current which is consumed in the line, that is, by the apparatus itself, and that which is consumed in the arc, only the latter, however, presenting the efficiency of the novel process.

An electric meter $C_2$ records the current used. V,

W, A are, respectively, voltmeter, wattmeter and amperemeter which permit measurement of the voltage, the power and the amperage of the transformer secondary. Highly insulated voltage transformers 11 and 13 are connected, respectively, to voltmeter V, wattmeter W and voltmeter $V_2$. A highly insulated transformer 12 supplies amperage to the wattmeter and amperemeter W and A. The voltmeter $V_2$ measures the voltage at the terminals of the electrodes 18.

The reactor 15 is provided with a double wall 16 forming a water-jacket and with means of evacuation which are well known and are not shown. The gaseous mixture enters the reactor by the fitting 17. The electrodes 18 and 19 are preferably disposed obliquely to each other and penetrate the reactor through insulated walls 18a and 19a; they are provided with rotors 8, 8' which turn them around their axes, and with apparatus 7 and 7' by which they may be moved closer together or further away from each other. Details of such apparatus are known and are not shown. The current for the arc is brought to the electrodes by terminals 14 and 14'.

Gas containing hydrocyanic acid issues from the reactor at 20 and is sent to an apparatus for cooling the gas and recovering the hydrocyanic acid. Such apparatus is known and is not shown.

The following examples describe the best modes of practicing the invention without limiting the generality of what is elsewhere herein stated.

*Example 1*

Into a reactor provided with copper electrodes 85 mm. apart, at a pressure of 88 mm. Hg absolute, there were passed 500 liters/hr. of $NH_3$ and 495 liters/hr. of methane, volumes measured at 0° C. temperature and 760 mm. Hg pressure. The arc was at 2400–2500 v. and 1.8–1.9 amperes. The mean cosine of the arc was 0.65, corresponding to a power dissipated in the arc of 2.93 kw., or a power of 1 kw. for a gas supply of 337 liters/hr. 360 grams/hr. of HCN were recovered. The energy used in the arc was thus 8.2 kw. hr./kg. HCN produced and the meter introduced into the line showed a consumption of 10.2 kw. hr./kg. HCN produced. 1 kg. of methane and 1.1 kg. $NH_3$ represented a yield from methane of 59.5%; 57.1% of the ammonia was transformed to HCN and 34% was recovered as ammonium sulfate.

*Example 2*

Into the reactor of Example 1, at a pressure of 64 mm. Hg absolute, there were sent 500 liters/hr. of ammonia and 155 liters/hr. of propylene, measured at atmospheric temperature and pressure. The arc was supplied with 2600 v. and 1.75 amperes. The cosine of the arc was 0.62 and the power dissipated was 2-8 kw., providing a power of 1 kw. for each 234 liters/hr. of the gases. Under these conditions there were produced 320 grams/hr. HCN. The energy used in the arc was 8 kw. hr./kg. HCN and the use in the line was 9.8 kw. hr. 900 grams propylene and 1180 grams $NH_3$ were consumed to produce each kg. of HCN. The yield based on hydrocarbon was thus 57.6%, and 53.4% based on the $NH_3$ was transformed to HCN. 37% of the $NH_3$ was recovered.

*Example 3*

Into the reactor of Example 1, at a pressure of 68 mm. Hg absolute, there were passed 500 liters/hr. of $NH_3$ and 125 liters/hr. of butane, volume measured at normal 0° and 760 mm. Hg pressure. The arc was of 2520 v. and 1.8 amperes. The cosine of the arc was 0.66 and the power used 3 kw., or a power of 1 kw. for each 208 liters/hr. There were produced 327 grams of HCN as an ingredient of a gas titrating 21% HCN and containing H and $NH_3$ excess. The consumption of energy in the arc was 8.55 kw. hr./kg. of HCN; the energy consumed in the line was raised to 10.4 kw. hr./kg. HCN. The quantity of butane consumed was 1 kg. and of ammonia 1.15 kg. per kg. of HCN produced. The yield based on hydrocarbons was 53.6%, and 54.9% of the $NH_3$ was transformed to HCN. 35% of the $NH_3$ sent to the reactor was recovered.

*Example 4*

A reactor, including two tungsten electrodes 95 mm. apart, was used. The gas arrived in the reactor at a pressure of 70 mm. Hg absolute at 500 liters/hr. of $NH_3$ and 178 liters/hr. of propane, volume measured at 0° and 760 mm. The arc was supplied with 2400 v. and 1.8 amperes. The cosine of the arc was 0.82, the power dissipated 3.3 kw., representing 1 kw. for each 205 liters/hr. of gas supplied. The amount of HCN produced rose to 381 grams/hr. in the form of a gas containing 23% HCN mixed with H and $NH_3$ in excess. The energy necessary to produce 1 kg. of HCN was thus 8.15 kw. hr. in the arc, with 9.9 kw. hr. consumed in the line. 880 grams of propane and 1000 grams of $NH_3$ were consumed for each kg. of HCN produced. The yield based on propane was thus 61.8%; 63% of the $NH_3$ was transformed to HCN, and the amount of $NH_3$ recovered was 27%.

*Example 5*

Using an installation such as shown in the drawing, with a reactor including two electrodes 30 cm. apart, a pipe for delivering gas to the reactor of 27 x 9 cm., the gas arriving in the reactor at an absolute pressure of 75 mm. Hg at a rate of 3000 liters/hr. of $NH_3$ and 1000 liters/hr. of propane (volume measured at 0° C. and 76 mm. of Hg), with a variable inductance of 1.75 henry situated between the secondary of the high-tension transformer and the reactor, the arc being supplied with 4200 v. and 9.7 amperes, and 16.5 kw. of power used in the arc, the production of HCN was 2.02 kg./hr. The apparatus was swept free of oxygen before the test and the mixed gases were free of oxygen.

The effective power delivered to the distributional apparatus was 20.6 kw., and the actual consumption of electrical energy was $$\frac{20.6}{2.02}$$

which equals 10.2 kw. hr./kg. of HCN produced.

The quantity of raw materials consumed per kg. of HCN was 1 kg. of propane and 1.1 kg. of ammonia, without considering the unreacted ammonia recovered from the reactor.

An advantage of the invention is that its efficiency over the earlier process, measured in electrical energy consumed per kilo of HCN produced, is much better. Thus, from published figures, the earlier process consumed 8–9 kw., which represents an average of 8.5 kw. hr., which produced 245 grams of HCN, or 35 kw. hr. per kilo of HCN produced. Likewise, when 3-phase current was used, the consumption amounted to 27 kw. hr. for each 742 grams of HCN, which made 36 kw. hr. per kilo of HCN produced. Compared with the figures above given for the new process, the old process consumed about four times as much energy for each kilo of HCN produced.

An essential difference between the processes, resulting in an advantage for this process, is the length of exposure to the arc, that of the earlier process being from .001 to .0002 second, as compared to the preferred .04 to .001 of this invention.

Another important advantage is the quantity of gas sent to the arc as a function of the power consumed. Thus, in the older process the flow was about 47 liters/hr./kw. to 54 liters/hr./kw. In the present invention the gas is supplied at a rate of 180–350 liters/hr./kw.

Another advantage is that this invention operates under reduced pressure (40–120 mm./Hg) whereas the earlier process operates at atmospheric pressure.

In both processes it is advisable to cool the apparatus and to eliminate oxygen from the gases sent to the arc.

As many apparently widely different embodiments of the present invention may be made without departing from the spirit and scope thereof, it is to be understood that the invention is not limited to the specific embodiments.

What is claimed is:

1. The method of making hydrocyanic acid from ammonia and an aliphatic hydrocarbon containing from 1 to 10 carbon atoms that comprises exposing a mixture of ammonia and such aliphatic hydrocarbon to an electric arc for a time on the order of .04 to .001 second at a ratio of 120 to 350 liters of mixed gas per hour per kilowatt consumed in the arc, and under an absolute pressure of about 40 to 120 mm. of mercury.

2. The gas-phase method of making hydrocyanic acid that comprises passing a mixture of ammonia and an aliphatic hydrocarbon containing from 1 to 10 carbon atoms through an electric arc under the following conditions: with pressure of 40–120 mm. Hg, with exclusion of oxygen, with a duration of exposure to the arc of about .04 to .001 second, with a mixture of ammonia and hydrocarbon gases supplied to the arc at a rate of about 120–350 liters per hour per kilowatt consumed in the arc.

3. The gas-phase method of making hydrocyanic acid that comprises passing a mixture of ammonia and an aliphatic hydrocarbon containing from 1 to 10 carbon atoms through an electric arc under the following conditions: under an absolute pressure of about 40 to 120 mm. of mercury, with a duration of exposure to the arc of about .04 to .001 second, with a mixture of ammonia and hydrocarbon gases supplied to the arc at a rate of about 120–350 liters per hour per kilowatt consumed in the arc, and with a ratio of voltage-to-amperage in the range of 400–1 to 1500–1.

4. The method according to claim 3 in which the hydrocarbon has two carbon atoms in the nucleus and the gas mixture is supplied to the arc at a rate of about 240–260 liters per hour per kilowatt of power consumed in the arc.

5. The method according to claim 3 in which the hydrocarbon has at least three carbon atoms in the nucleus and the gas mixture is supplied to the arc at a rate of about 180–240 liters per hour per kilowatt of power consumed in the arc.

6. The method of making hydrocyanic acid which consists in passing a gaseous mixture of ammonia and methane through an electric arc at a pressure between 40 and 120 mm. Hg, the gaseous mixture being supplied at a rate of about 270–350 liters per hour per kilowatt of power consumed in the arc, volume being measured at 0° and 760 mm. Hg, and duration of contact with the arc being between about $1/25$ and $1/1000$ second.

7. The method of making hydrocyanic acid from ammonia and a first gaseous mixture of aliphatic hydrocarbons each containing from 1 to 10 carbon atoms that comprises exposing a second gaseous mixture of ammonia and said first mixture of aliphatic hydrocarbons to an electric arc for a time on the order of .04 to .001 second at a ratio of 120 to 350 liters of said second mixture of gases per hour per kilowatt consumed in the arc, and under an absolute pressure of about 40 to 120 mm. of mercury.

References Cited in the file of this patent

UNITED STATES PATENTS

| 792,783 | Muthmann | June 20, 1905 |
| 2,679,544 | Bills | May 25, 1954 |

FOREIGN PATENTS

| 780,080 | Great Britain | July 31, 1957 |